Patented June 14, 1932

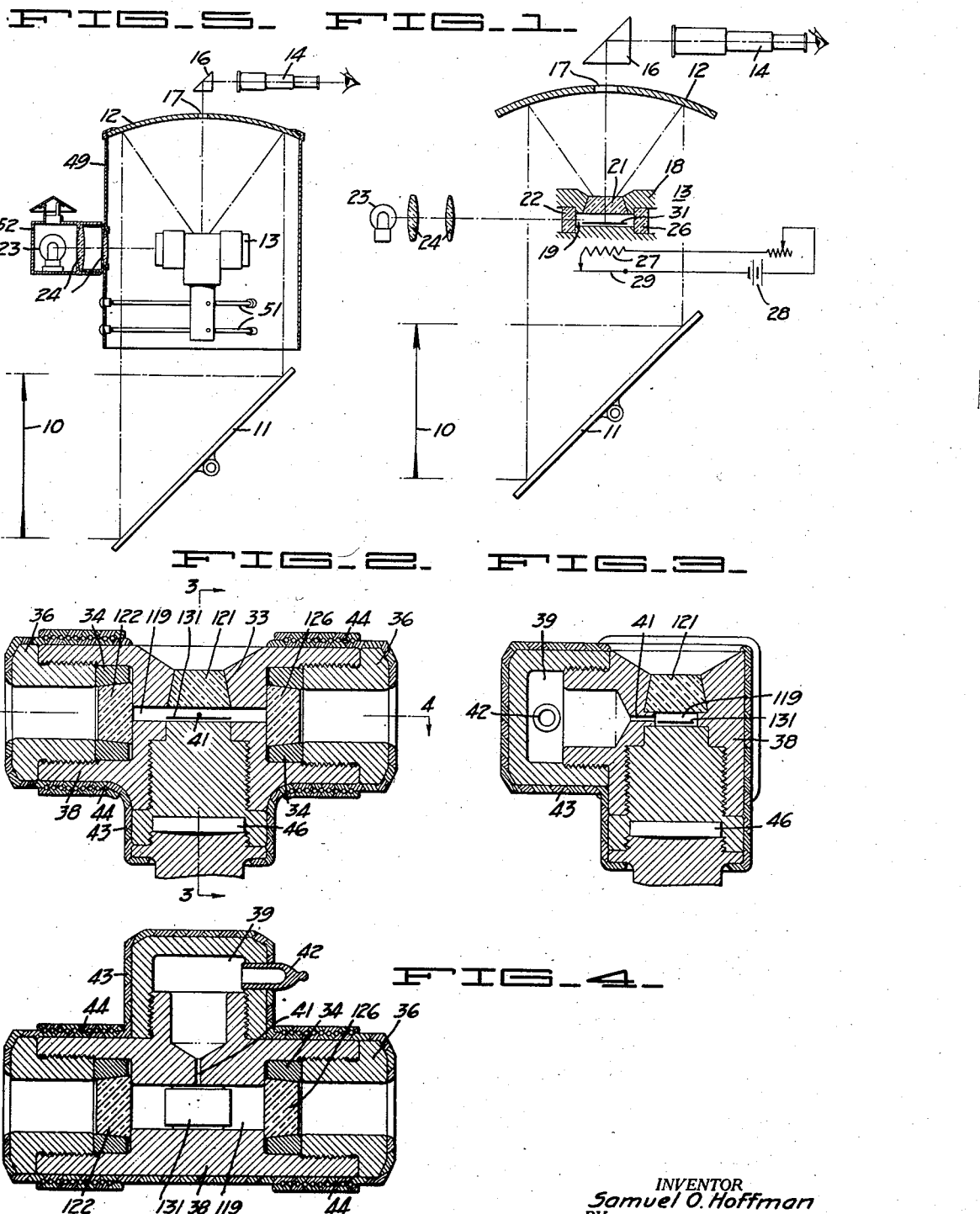

1,862,622

UNITED STATES PATENT OFFICE

SAMUEL O. HOFFMAN, OF SAN FRANCISCO, CALIFORNIA

TRANSLATING DEVICE

Application filed May 9, 1927. Serial No. 189,782.

This invention relates generally to apparatus for and methods of effecting a translation of energy into a physical indication.

It is an object of this invention to devise a simple form of energy translating apparatus which will utilize a substance sensitive to energy absorption.

It is a further object of this invention to devise means for changing the light inflective properties of different parts of a constantly illuminated area in accordance with the character of exciting energy.

It is a further object of this invention to devise improved means for translating radiant energy into light indication, which will function to reproduce an image of a distant body by thermal radiation.

It is a further object of this invention to devise means for translating energy into light indication which will make use of a substance under critical condition, whereby a slight change in its temperature will be accompanied by a marked change in the light inflective properties of the substance.

It is a further object of this invention to devise means for utilizing critical opalescence of a substance for translating energy into light indication.

It is a further object of this invention to devise a novel method of attaining the various objects set forth above.

Further objects of this invention will appear from the following description in which I have set forth the preferred embodiment of my invention. It is to be understood that the appended claims are to be accorded a range of equivalents consistent with the state of the prior art.

Referring to the drawing:

Figure 1 is a schematic view illustrating the invention incorporated in a system for detecting bodies by thermal radiation.

Fig. 2 is a vertical cross section taken thru a thermal sensitive cell constructed in accordance with this invention.

Fig. 3 is a section taken along the line 3—3 of Fig. 2.

Fig. 4 is a section taken along the line 4—4 of Fig. 2.

Fig. 5 is a transverse cross sectional view of a complete apparatus for detecting bodies by thermal radiation.

It is commonly known that many substances vary their light inflective properties under different physical conditions and in different physical phases. By inflective properties I refer broadly to the bending of light rays by refraction, reflection or diffusion. For example carbon dioxide in the liquid state possesses an index of refraction which is of a value far different from that of the same substance in the vapor phase. In this invention I make use of a change in the light inflective properties of a substance to indicate absorption or dissipation of energy.

I have found that certain substances may be placed in a critical condition in which their light inflective properties are extremely sensitive to heat absorption. One such substance is carbon dioxide when substantially at its critical point. By critical point I refer to that value of temperature and pressure at which the density of the liquid becomes equal to that of its saturated vapor, and above which temperature it is impossible to liquefy the gas. At this temperature the meniscus of the fluid disappears and its density is the critical density. For carbon dioxide the critical point is 31.0 deg. centigrade, and a pressure of 72.9 atmospheres. The compressibility of a fluid increases very rapidly as the critical point is approached, becoming infinite at the exact critical point. Due to this enormous compressibility of a fluid near its critical point, a pure fluid, freed from dissolved air, when heated to its critical temperature, exhibits the peculiar phenomena of opalescence, that is, it scatters or diffuses light and has a milky appearance. I have found that this condition is extremely critical and that slight increases or decreases in temperature above or below the critical point cause a sharp falling off of the degree of opalescence. In this invention the energy being detected is utilized to effect minute changes in the thermal state of a substance at the critical point, and the change in opalescence serves as a means for translating the energy into a light indication. I have also found that if different amounts of heat are supplied to different parts of a body of a substance at the critical point, the opalescence of the different parts will vary accordingly. This characteristic I have utilized to reproduce an image of a body by thermal radiation concentrated upon a substantial area of the substance. Thus I have accomplished transmission of accurate images without the use of luminous rays.

With respect to that phase of this invention which is applicable to the detection of bodies by thermal radiation, the subject matter herein described is an improvement over apparatus and method described in my Patent No. 1,343,393 issued June 15, 1920. In that patent I described broadly a method of indicating thermal radiation by focusing the same upon a thermopile, the pile serving to translate the radiation into light indication. An arrangement of that kind may be used to detect the presence of ships, aeroplanes or other objects at night time, if the objects differ in temperature from their back ground. Under favorable conditions it may be used to detect the presence of objects having the same temperature as their back ground but differing as to color, that is of a different absorbing or reflecting power for radiation. The apparatus makes use of long wave length infra red radiation which is emitted by all bodies at ordinary temperatures. I also disclosed means for securing a visible image from thermal radiation received from an object. The apparatus shown in the above patent made use of a plurality of thermopiles which formed a thermo sensitive surface upon which an image of the object in thermal radiation was focused. The response produced by each of these thermopiles was separately translated to secure a light indication, and their combined effect served to reproduce a visual image which approximated the original object. It is obvious that to reproduce an accurate visual image by apparatus of this kind, a great number of small thermopiles must be employed and the apparatus must necessarily be complicated by the use of separate means for translating the separate indications. This invention may be utilized as a substitute for the translating means shown in the above mentioned patent, and when so employed, it not only greatly increases the sensitivity of the system, but makes possible an accurate visual image of the object being detected without the use of complicated apparatus or multiple circuits.

In the drawing I have shown a system similar to that disclosed in my Patent No. 1,343,393, with which this invention has been associated. Thus the arrow 10 represents a distant body which is emitting thermal radiation, or which is disposed before a thermal radiating back ground. Rays from the object 10 are reflected by the mirror 11 upon the parabolic reflector 12, which concentrates the same upon the thermal sensitive device 13. It is commonly known that infra red rays, or thermal radiation, obeys the laws of reflection and refraction the same as ordinary visible light rays. Since many transparent substances have an absorbing action upon thermal radiation, I prefer to use reflecting surfaces rather than lenses. For noting the image formed by the thermal sensitive cell 13, I have shown a conventional magnifying device 14 and a refracting prism 16, whereby the cell 13 may be viewed through an opening 17 in reflector 12.

The thermal sensitive cell 13 is the principal feature of this invention and as diagrammatically shown in Fig. 1 comprises a body member 18 formed with an inner chamber 19, adapted to contain a substance which exhibits the phenomena of opalescence. This chamber is preferably relatively small in vertical dimension compared to its horizontal dimensions, in order to prevent the inherent weight of the substance itself from effecting the critical point. One wall of chamber 19 is formed by a window 21 of some material which is transparent to thermal radiation, such for example as crystal rock salt. The substance within the chamber 19 is illuminated by light rays which are permitted to shine through a window 22, which may be made of common glass. As a source of light I have indicated diagrammatically a lamp 23 whose rays are being focused upon window 22 by lenses 24. Opposite from the window 22 another light window 26 may be provided to afford a convenient means to allow the light to escape rather than to be absorbed by the substance within the chamber.

Assuming now that same substance is placed within the chamber 19 which may be maintained at a critical point, the opalescent condition will cause the light from lamp 23 to be diffused and to give the substance a milky or opalescent appearance. In order to keep the substance exactly at this critical point, the temperature of body 18 must be maintained substantially at a constant value corresponding to the critical temperature, and the amount of substance within chamber 19 must be such that with the temperature at this value, the optimum conditions are present to produce the critical opalescent condition. For maintaining the substance at this critical temperature, I have shown the use of an electrical resistance 27 in thermal contact with body 18 and supplied from a suitable source of current such as battery 28. A temperature responsive circuit controller 29 is included in the circuit and also is in thermal contact with body 18, so that the current is regulated to maintain the temperature of body at the desired value. Assuming for example that the chamber contains pure carbon dioxide gas, then the body 18 is maintained substantially constant at 31.0 deg. centigrade, and with the proper amount of carbon dioxide at this temperature the pressure within the chamber will be substantially 72.9 atmospheres.

As the thermal radiations fall upon the carbon dioxide, they are absorbed to slightly increase the temperature of the fluid at the points of absorption. Assuming that the fluid is at the critical point where the opalescence is at a maximum, those portions of the gas which absorb thermal radiation and slightly increase their temperature, become less opalescent than the remainder of the gas. If the temperature of body 18 is normally such that carbon dioxide is slightly below the point of maximum opalescence, then the absorption of thermal radiations tends to bring about a greater degree of opalescence. In either event an observer looking through the telescope device 14 will see the reproduction of an image produced by opalescent effect of the carbon dioxide. It is to be understood that I may also utilize a change in opalescent effect due to cooling of the sensitive substance caused by directing the instrument toward a relatively cold body such for example as the night sky, when it is desired to observe an object such as an airplane.

In order to facilitate absorption of heat by the carbon dioxide, a heat absorbing surface 31 may be disposed within the chamber 19, this surface being disposed horizontally and normal to the general direction of the thermal radiations. In practice this surface is formed by an exceedingly thin screen made for example of metal leaf, pyroxyline or other suitable material and has a blackened surface to increase its effectiveness as an absorber of radiant heat. In order to minimize the time lag, the mass of screen 31 should be very small, and it should be capable of having different parts of its area maintained at slightly different temperatures in order to permit the forming of a shaded and outlined image. The quantity of the substance used, such as carbon dioxide, is preferably adjusted so that when the temperature is dropped very slightly below the critical temperature, a meniscus will form at approximately the position of the absorbing surface of the screen, thus having the absorbing surface in fluid of the critical density. Instead of using screen 31, the absorbing effect of the carbon dioxide may be supplemented by mixing it with other gases having greater heat absorbing properties, as for example sulphur dioxide. A mixture of carbon dioxide and sulphur dioxide may also be used together with the heat absorbing screen 31 in order to secure greatest sensitivity.

The minute temperature variations necessary to produce a change in opalescence, makes it possible to reproduce an accurate light image corresponding to the distribution of the thermal radiation upon the gas. As the difference between the temperatures of different points within the gas is relatively slight, substantially no heat is conducted from one point to another so that two adjacent parts of the gas may be at different degrees of opalescence due to the absorption of radiations of different intensities, without causing the two indications to blend into one. It is obvious that this invention is therefore applicable to a variety of electrical apparatus, wherever it is desired to produce the effect of light shading upon a common area.

In Figs. 2, 3 and 4 I have shown the details of a specific embodiment of the thermal sensitive cell shown diagrammatically in Fig. 1. In this case the window 121 has a ground fit within a conical seat 33. The glass windows 122 and 126 are likewise fitted within rings 34, and are retained in place by means of the hollow plugs 36. The body 38 is made of some material such as steel which will withstand relatively high pressures. The plug 36 is threaded within the body, and serves as a means for permitting positioning the window 121 and the heat absorbing screen 131. The chamber 119 is in communication with a relatively large reservoir 39 through a small passageway 41, reservoir 39 being sealed by means of tube 42. In practice the reservoir 39 and chamber 119 are first exhausted of air, and then filled with carbon dioxide or other substance, after which tube 42 is sealed. Care should be taken to have the carbon dioxide as pure as possible, and the interior walls of the body should be cleared of all occluded gases. Suitable insulating material 43 is disposed about the exterior of the body, and a heating resistance wire 44 wound thereon. A thermal current controller 46 has been shown as being in thermal contact with the body. Since the nature of such controllers is well known in the art, the construction of this device will not be explained in detail.

In Fig. 5 I have shown a more complete form of apparatus incorporating a thermal senstive unit such as described above. In this case the unit is disposed within a casing 49, at one end of which is disposed the parabolic reflector 12, the other end being open to receive thermal radiation from the reflector 11. The unit 13 is suitably supported at the focal point of the reflector 12, as by means of radial rods 51. The lamp 23 is disposed within a separate closure 52 so as to direct a beam of light upon the unit 13. The mirror 11 is pivotally mounted as shown so that it may be tilted to any desired angle to receive thermal radiation from any desired direction. Thus the screen 131 may be kept relatively horizontal during operation of the device. This is desirable in order to maintain the plane of critical density substantially coincident with the absorption surface.

In addition to carbon dioxide, it is to be understood that I may use a number of other substances which exhibit the phenomena of opalescence when under critical condition. For example I may use the gas xenon, which has a critical temperature of 16.6 deg. centigrade and a critical pressure of 58.2 atmospheres. This material is particularly effective since it has an extremely high critical density 1.55 grams per cubic centimeter, and is therefore highly opalescent at critical temperature and extremely sensitive to temperature variations. In general it may be stated that the substance which is employed to obtain critical opalescence should not have such high critical temperature as to make it impractical to maintain it at the critical point. Another gas which may be used is ethyl ether which has a critical pressure of 36.6 atmospheres and a critical temperature of 193.8 deg. centigrade.

While I prefer to employ the critical opalescence of gases, I may also utilize the critical opalescence of substances in the immediate vicinity of their critical solution point. Many substances dissolve completely above or below a certain critical temperature. For example, a mixture of phenol and water will form a perfect solution when heated above a certain temperature. If the solution is cooled to a temperature slightly above that at which the constituents separate, it will exhibit the phenomena of critical opalescence and will be sensitive to temperature changes. A mixture of 36.1 parts phenol and 63.9 water gives a critical opalescent effect at 66 deg. centigrade. A mixture of this sort need not be maintained under pressure as in case of gases.

For the sake of simplicity I have limited my description to the use of visible light as the means for illuminating the substance within the chamber. However it is true that in most instances, light scattering or opalescent effect increases considerably for shorter wave lengths, opalescent light as a rule being bluish in color due to the preponderance of short wave lengths. It follows that if recourse be made to photographic or fluorescent receiving means, that short wave lengths beyond the range of visibility may be used for the illumination.

I claim:

1. Means for translating energy variations into light indication comprising a substance adapted to absorb said energy, and means for maintaining said substance at a fixed temperature at which its light inflective properties are sensitive to energy absorption.

2. Means for translating radiant energy into light indication comprising a fluid substance adapted to absorb said energy to effect a change in its thermal state, and means for maintaining said substance under critical physical conditions at which it exhibits opalescence.

3. Means for translating energy variations into light indication comprising an enclosed body of a substance adapted to absorb said energy to effect a change in its thermal condition, said substance being maintained under critical physical conditions at which its light inflective properties are sensitive to temperature variations, and means for illuminating said substance.

4. Means for translating radiant energy into light indication comprising a fluid substance maintained substantially at that critical temperature and pressure at which the density of the fluid as a liquid becomes equal to its saturated vapor.

5. Means for translating radiant energy into light indication comprising a body having a closed chamber containing a fluid substance maintained substantially at that critical temperature and pressure at which the density of the fluid as a liquid becomes equal to its saturated vapor, and means for applying heat to said body to maintain the same at said temperature.

6. Means for translating radiant energy into light indication comprising a substance maintained under critical physical conditions at which its light transmitting propertes are critical to heat absorpton, said substance occupying a substantial area along one plane, and means for directing light rays into said substance at an angle to a direction normal to said plane.

7. In a device of the class described, a body forming an enclosed chamber, a fluid substance within said chamber, a thermal radiation transmitting substance forming a wall of said chamber, and means for maintaining said body at the critical point of said fluid at which the density of the fluid as a liquid becomes equal to the density of its saturated vapor.

8. A translating device comprising a constantly illuminated area, and means for varying the light inflective properties of portions of said area to form an image.

9. A translating device comprising a constantly illuminated area, and means for varying the light inflective properties of portions of said area in response to invisible energy.

10. The method of detecting radiant energy which comprises maintaining a normally unresponsive substance under a critical condition at which its light inflective properties are sensitive to energy absorption by the substance, and directing radiant energy upon the substance.

11. A method of detecting radiant heat rays which comprises maintaining a normally unresponsive substance under a critical condition at which it exhibits the phenomenon of opalescence and directing heat rays upon the substance.

12. The method of detecting thermal radiation which comprises maintaining a normally unresponsive substance under physical conditions at which it is sensitive to thermal radiation and concentrating a thermal radiation upon the substance to vary one of the characteristics of the substance.

13. The method of forming an image of a body by thermal radiation from the same characterized by the use of a normally unresponsive substance, said method comprising concentrating said thermal radiation upon said substance, and maintaining said substance under critical physical conditions and thus causing an image to be formed by the opalescent effect of absorption of thermal radiation by said substance.

14. A translating device comprising a constantly illuminated area formed by a substance under critical conditions of pressure and temperature, and means for varying the light inflecting properties of portions of said area to form an image.

15. A translating device comprising a constantly illuminated area, and means for varying the light inflective properties of portions of said area in response to absorption of invisible radiant energy.

16. Means for translating energy variations comprising a substance whose light inflective properties are sensitive to energy absorption, said substance occupying a substantial area, and means for illuminating said area.

17. Means for translating energy variations comprising a substance whose light inflective properties are sensitive to energy absorption, and means for causing said substance to absorb energy of said variations.

18. Means for translating energy variations comprising a substance whose light inflective properties are sensitive to energy absorption, means for causing said substance to absorb energy of said variations, and additional means for illuminating said area.

19. A system for detecting objects at a remote point comprising a substance maintained under critical conditions at which its light inflective properties are sensitive to energy absorption, said substance being arranged to form a substantial area, and means for receiving and directing invisible radiations upon said substance, said radiations being affected by a remote object.

20. A system for detecting objects at a remote point comprising a substance maintained under critical conditions at which its light inflective properties are sensitive to energy absorption, said substance being arranged to form a substantial area, means for locally flooding said area with light spectrum radiation, and means for receiving and directing invisible radiations upon said substance, said radiations being affected by a remote object.

In testimony whereof I have hereunto set my hand.

SAMUEL O. HOFFMAN.